US011727352B2

(12) United States Patent
Mimassi

(10) Patent No.: US 11,727,352 B2
(45) Date of Patent: *Aug. 15, 2023

(54) PREDICTIVE FINANCIAL, INVENTORY AND STAFFING MANAGEMENT SYSTEM

(71) Applicant: RockSpoon, Inc., San Jose, CA (US)

(72) Inventor: Nagib Georges Mimassi, Palo Alto, CA (US)

(73) Assignee: ROCKSPOON, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/585,652

(22) Filed: Jan. 27, 2022

(65) Prior Publication Data

US 2022/0222615 A1 Jul. 14, 2022

Related U.S. Application Data

(63) Continuation of application No. 17/153,213, filed on Jan. 20, 2021, now Pat. No. 11,276,035.

(Continued)

(51) Int. Cl.
*G06Q 10/087* (2023.01)
*G06Q 50/12* (2012.01)
(Continued)

(52) U.S. Cl.
CPC ............. *G06Q 10/087* (2013.01); *G06N 5/04* (2013.01); *G06N 20/00* (2019.01); *G06Q 10/04* (2013.01);
(Continued)

(58) Field of Classification Search
CPC .... G06Q 10/087; G06Q 40/125; G06Q 10/04; G06Q 10/063118; G06Q 10/1053;
(Continued)

(56) References Cited

U.S. PATENT DOCUMENTS 6,341,271 B1 1/2002 Salvo et al.
8,768,867 B1 * 7/2014 Thaeler ................. G06Q 30/02
706/12

(Continued)

OTHER PUBLICATIONS

Is "Inventory of Goods Data Processing using the Economic Order Quantity Method" Published by Journal of Physics (Year: 2020).*

*Primary Examiner* — Zeina Elchanti
(74) *Attorney, Agent, or Firm* — Galvin Patent Law LLC; Brian R. Galvin

(57) ABSTRACT

A system and method for real-time predictive financial, inventory, and staffing management. The system is a cloud-based network containing a predictive cashflow management engine, payment engine, predictive inventory management engine, inventory optimization engine, predictive staffing management engine, staff optimization engine, mobile and compute devices, staff and vendors, gateways for vendors and staff to interface with financial institutions and other 3$^{rd}$ party businesses, enterprise database to store and retrieve including financial data, staffing data, and inventory data. Taken together or in part, optimize organizational operations by predicting and optimizing in real-time key operational decisions using artificial intelligence or other computerized methods around financial, staffing, and inventory management based upon a multitude of variables associated with the enterprise.

20 Claims, 15 Drawing Sheets

Related U.S. Application Data

(60) Provisional application No. 63/005,899, filed on Apr. 6, 2020.

(51) Int. Cl.
  *G06Q 10/0631* (2023.01)
  *G06Q 40/12* (2023.01)
  *G06N 20/00* (2019.01)
  *G06N 5/04* (2023.01)
  *G06Q 10/04* (2023.01)
  *G06Q 10/1053* (2023.01)
  *G06Q 10/1091* (2023.01)
  *G06Q 20/34* (2012.01)
  *G06Q 40/03* (2023.01)

(52) U.S. Cl.
  CPC . *G06Q 10/063118* (2013.01); *G06Q 10/1053* (2013.01); *G06Q 10/1091* (2013.01); *G06Q 20/34* (2013.01); *G06Q 40/03* (2023.01); *G06Q 40/125* (2013.12); *G06Q 50/12* (2013.01); *G06Q 10/06311* (2013.01)

(58) Field of Classification Search
  CPC .. G06Q 10/1091; G06Q 20/34; G06Q 40/025; G06Q 50/12; G06Q 10/06311; G06N 20/00; G06N 5/04
  USPC .......................................................... 705/28
  See application file for complete search history.

(56) References Cited

U.S. PATENT DOCUMENTS

| | | | |
|---|---|---|---|
| 9,786,005 B1* | 10/2017 | Poursartip | G06Q 10/06315 |
| 2010/0036706 A1* | 2/2010 | Cohen | G06Q 10/06315 |
| | | | 705/7.38 |
| 2016/0342929 A1 | 11/2016 | Tanaka et al. | |
| 2018/0374109 A1 | 12/2018 | Scarpati et al. | |
| 2020/0247661 A1* | 8/2020 | Rao | G05B 19/41865 |

* cited by examiner

PREDICTIVE FINANCIAL, INVENTORY AND STAFFING MANAGEMENT SYSTEM

CROSS-REFERENCE TO RELATED APPLICATIONS

Priority is claimed in the application data sheet to the following patents or patent applications, the entire written description of each of which is expressly incorporated herein by reference in its entirety:
63/005,899
Ser. No. 17/153,213

BACKGROUND

Field of the Art

The disclosure relates to the field of computer-based optimization, predictive systems, and artificial intelligent systems, and more particularly to the field of computerized predictive and optimization systems using artificial intelligence as related to real-time organizational operations for finance, inventory and staffing management for organizational establishments.

Discussion of the State of the Art

Typical organizational establishments operate their business based upon financial and operations data that is historical in nature. Decisions made are often arrived at based upon past events or situations that have occurred in the past, without taking into account dynamic real-time situations that are unfolding in the current market conditions in which the organization is operating. As a result, organizations are not able to fully leverage their cash on-hand by taking calculated risks on opportunities (e.g., microloans or inventory stock piling) that may present themselves. Similarly, restaurants as an example, are not free to dynamically change menu items based on ingredients on hand and/or culinary skills available that maximizes their business outcomes and impact on a particular patron and/or prospective patron dining experience. The result is often a near-term suboptimal dining experience for restaurant consumers and long-term viability for the restaurant.

There is currently no real-time system that predicts and optimizes financial, inventory and staffing to address these shortcomings.

What is needed is a system and method for real-time financial, inventory, and staffing management system to optimize organizational operations for short- and long-term business competitive advantage and viability.

SUMMARY

Accordingly, the inventor has conceived, and reduced to practice, a system and method for real-time financial, inventory and staffing management. The system is a cloud-based network containing a predictive cashflow management engine, payment engine, predictive inventory management engine, inventory optimization engine, predictive staffing management engine, staff optimization engine, mobile and compute devices for restaurants, staff and vendors, gateways for vendors and staff to interface with financial institutions and other 3$^{rd}$ party businesses, enterprise database to store and retrieve including financial data, staffing data, and inventory data. Taken together or in part, said system optimizes business operations by predicting and optimizing in real-time key operational decisions around financial, staffing, and inventory management based upon a multitude of variables associated with the business enterprise. The system may be accessed through web browsers or purpose-built computer and mobile phone applications.

According to a preferred aspect, a system using machine learning for integrated restaurant real-time financial, inventory, and staffing management is disclosed, comprising: a computing device comprising a memory, a processor, and a non-volatile data storage device; a real-time finance, inventory and staffing management server comprising a first plurality of programming instructions stored in the memory which, when operating on the processor, causes the computing device to: receive real-time user information from a user device via a wireless network, the real-time user information comprising device location, time, and user financial information; receive a plurality of stored and third-party data comprising financial, inventory, staff, and patron related information via the wireless network, vectorize the received plurality of stored and third party data using principal component analysis to reduce the dimensionality of the vectors, use the vectors as input into a machine learning algorithm to create a plurality of neural networks, and use the plurality of neural networks to: analyze the received data using vector space analysis to predict future patron attendance based at least in part on received location information; analyze the received data using vector space analysis to predict future staffing requirements based on the received location information; analyze the received data using vector space analysis to determine real-time inventory usage; automatically generate a plurality of inventory adjustment recommendations based on the determined real-time inventory usage, patron data, and third-party data comprising at least one of: local news and events, current and forecasted weather, a social media posting, or a rating or review; automatically place an order for goods based on the determined real-time inventory usage and the plurality of inventory adjustment recommendations; and analyze the received data to determine real-time cash flow and to predict future cash flow.

According to another preferred aspect, a method using machine learning for integrated restaurant real-time financial, inventory, and staffing management is disclosed, comprising the steps of: connecting a real-time finance, inventory and staffing management server comprising a first plurality of programming instructions stored in a memory of a computing device comprising the memory, a processor, and a non-volatile data storage device, to a user device via a wireless network; wirelessly receiving, at the real-time finance, inventory and staffing management server, real-time user information from the user device, the real-time user information comprising device location, time, and user financial information; wirelessly receiving, at the real-time finance, inventory and staffing management server, a plurality of stored and third-party data comprising financial, inventory, staff, and patron related information, vectorizing the received plurality of stored and third-party data using principal component analysis to reduce the dimensionality of the vectors, using the vectors as input into a machine learning algorithm to create a plurality of neural networks; using the plurality of neural networks to: analyze the received data using vector space analysis to predict future patron attendance based at least in part on the received location information; analyze the received data using vector space analysis to predict future staffing requirements based on the received location information; analyze the received data using vector space analysis to determine real-time inventory usage; automatically generate a plurality of inventory adjustment recommendations based on the determined real-time inventory usage, patron data, and third-party data comprising at least one of: local news and events, current and forecasted weather, a social media posting, or a rating or review; automatically place an order for goods based on the determined real-time inventory usage and the plurality of inventory adjustment recommendations; and analyze the received data to determine real-time cash flow and to predict future cash flow.

According to an aspect of an embodiment, a financial database is stored on the non-volatile data storage device, the financial database comprising at least one of: point-of-sale data for a plurality of sales transactions, accounts receivable information for a plurality of vendors, accounts payable information for a plurality of vendors, financial account information for a plurality of banking institutions, a food item, a food amount, a food cost, or time and location descriptors.

According to an aspect of an embodiment, the real-time finance, inventory and staffing management server receives financial data; and wherein the received financial data comprises accounts receivable and accounts payable data, and the accounts receivable and accounts payable data comprises at least one of: an account receivable entity name, a service rendered, a product delivered, an amount paid, balance due and credit terms, an account payable entity name, a service rendered, a product delivered, an amount paid, or balance due and credit terms.

According to an aspect of an embodiment, wherein the financial database further comprises a stored operational cost profile, the operational cost profile comprising at least one of: hours of operation, leasehold costs, tax and insurance costs, cost of goods sold, profit margins, salary costs, hourly wage costs, or professional services costs.

According to an aspect of an embodiment, the retrieved staff data comprises a staffing profile, the staffing profile comprising at least one of: number of hourly staff previously scheduled, hourly staff previously worked, staff skill-level, planned hourly staff schedule, a staff member name, a staff member skillset, a staff member availability, or compensation details for a staff member.

According to an aspect of an embodiment, the staffing profile is updated with real-time third-party data, the real-time third-party data comprising at least one of: local news and events, current and forecasted weather, a social media posting, or a rating or review relevant to each staff profile.

According to an aspect of an embodiment, the staffing profile is used to generate a loan risk profile and a plurality of loan recommendations based on the loan risk profile.

According to an aspect of an embodiment, an inventory database is stored on the non-volatile data storage device, the inventory database comprising at least one of: a quantity of an item on-hand, a par level, a last re-order date, an expiration date, or a forecasted re-order date; real-time third-party data, the real-time third-party data comprising at least one of: local news and events, current and forecasted weather, a social media posting, or a rating or review; and stored patron data comprising at least one of: a food item previously purchased, day and time data, weather conditions, or local news and events.

According to an aspect of an embodiment, the inventory adjustment recommendations generate menu changes for a restaurant based on patron trends or inventory availability.

According to an aspect of an embodiment, a payment engine used to: receive payment data, the payment data comprising at least one of: a payor name, a payor address, a payee identifier, an invoice identifier, or a payment amount; retrieve a stored payee profile, the stored payee profile comprising at least one of: a payee name, a payee address, an open invoice, a balance due, or payment preference information; transmit payment information to a payment processing system, the payment information being based on the payment data and the payment transaction.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
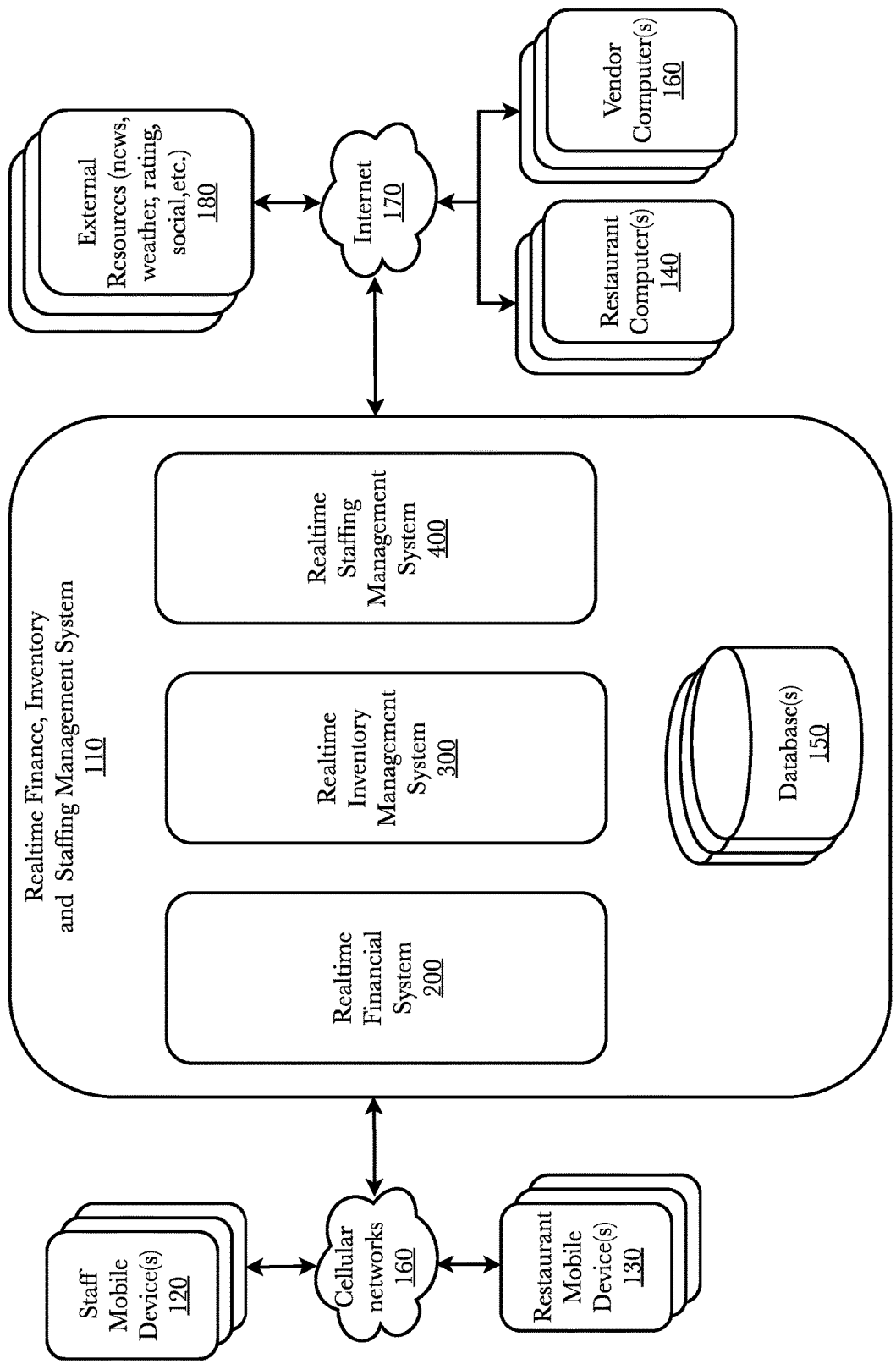
FIG. 1 is a block diagram illustrating an exemplary system architecture for a real-time finance, inventory and staffing management system.

The inventor has conceived, and reduced to practice, a system and method for real-time predictive finance, inventory and staffing management system. The system is a cloud-based network containing real-time financial system, real-time inventory management, real-time staffing management engines, portals for restaurants, staff and vendors, to receive updates and enter their information; and gateways to access real-time data and to make real-time adjustments to drive optimizations across the organization. The system may be accessed through web browsers or purpose-built computer and mobile phone applications.

It is frequently the case that an organization wishes to optimize their operations around a set of explicit requirements (e.g. maximize cash reserves, minimize staff expenses, increase average sale price, etc.) as well as an implicit requirement (improve brand awareness, increase customer satisfaction, "widen the gap" between the competition, etc.). Additionally, the restaurant may have long term business goals (e.g. geographic expansion, offering expansion, etc.) that should be taken in consideration as they go about their day-to-day operations. However, achieving the desired outcome using currently available tools is challenging given the lag of feedback from current business operations and the lack of integration between financial systems, inventory and staffing systems. Ultimately the results often lead to a suboptimal outcome for the restaurant, restaurant staff, patron leading to loss of viability for the business. Restaurants often make financial, inventory and staffing decisions based on historical data that is often done without full appreciation of the overall business it will have on current and future operations. For example, future staffing schedules are typically based only on previous staffing demands from the past several weeks and expected restaurant loading. Once a staff schedule is in place, it remains mostly static for the entire duration, e.g. for the week or two-week period, with limited changes being made by a shift manager who may 'send someone home early' should there be a 'lull' in business. If there is an unexpected 'rush' in patrons to the business, the restaurant is often left scrambling resulting in a poor patron experience and ultimately loss of business for the restaurant. Similarly, restaurant inventory management and purchases are often conducted with stale information and without full appreciating of the overall business. Food items are often ordered based on previous consumption without considering potential for seasonal, weather, near real-time patron interests. Inventory management conducted in this manner often leads to an over purchase leading to excess wastage, or an under purchase leading to missed opportunity and decreased patron satisfaction. In summary, all of these methods are inefficient and none of them takes into account a myriad of factors that may affect financial, inventory and/or staffing decision such as current cash on-hand, trending patron food interest or actual staffing needs.

The invention is particularly useful to both organizations and their staff in optimizing business operations and staff working experience. Real-time finance, inventory and staffing enables organizations to optimize their business by enabling them to put their capital to work through micro-loans, purchase discounted inventory items, make near real-time staffing adjustments to meet customer demands without overstaffing; and make near real-time menu changes to take advantage of existing inventory or capitalize on patron trending food preferences in the case of restaurants. Patrons can select food items based on their current and past dietary requirements and preferences. As will be further disclosed herein, the invention makes a multivariate analysis of a large variety of factors (patron preferences; inventory on-hand, staffing culinary skill; social validation; etc.) to allow a business to optimize their day-to-day operations in near-real-time fashion while being able to capitalize on emerging business opportunities through real-time cash management, predictive inventory, and staffing demands.

While the use case of a restaurant business owner optimizing their business operations is a primary example used herein, it is important to note that the invention is not so limited, and may be used by any business (i.e., the invention is not limited to restaurants, and can be applied to any retail goods, such as grocery stores, on-line and/or brick and mortar; service business, such as home cleaning, lawn care, financial services) seeking to optimize their cash flows, staff and inventory in a real-time fashion. Additionally, while data ingestion, optimization, and prediction is generalized to machine-learning, it is known in the art that many machine-learning algorithms and methods may be implemented to perform the same function with only a difference in performance or other properties not tied to the outcome of the algorithm.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

reference to which they are described. The present disclosure is neither a literal description of all arrangements of one or more of the aspects nor a listing of features of one or more of the aspects that must be present in all arrangements.

Definitions

"Business establishment" or "place of business" as used herein mean the location of any business entity with which customers may transact business. Typically, this will be a physical location where customers may enter the location and transact business directly with employees of the business, however, it may also be a delivery-based business. Many examples herein use a restaurant as the business establishment, but the invention is not limited to use in restaurants, and is applicable to any business establishment. "Patron" is used to reference the customer or prospective customer of the business establishment. "Staff" is used to reference the employee or contractor of the business establishment.

Conceptual Architecture

FIG. 1 is a block diagram illustrating an exemplary system architecture for a real-time finance, inventory and staffing management system 110, according to a preferred aspect. According to an aspect, and using a restaurant as an exemplary business establishment, system comprises a real-time financial system 200, a real-time inventory management system 300, a real-time staffing management system 400, and databases 150. Staff mobile devices 120 and restaurant mobile devices 130, may connect to real-time finance, inventory and staffing management system 110, typically via a cellular phone network 160, although connections may be made through other means, as well, such as through Internet 170 (e.g., through a Wi-Fi router). Restaurant computers 140 and/or vendor computers 160 may connect to real-time finance, inventory, and staffing management system 110, typically through an Internet 170 connection, although other network connections may be used.

According to an aspect, a restaurant may access restaurant computer 140 to enter or update a variety of financial information that may include lease hold costs, loaded labor rates, cost of goods sold menu items, recipe information, inventory on-hand, staff, staffing needs, culinary skill requirements along with other information that may be stored in a database 150, and used by real-time financial system 200 that may offer or execute financial transactions to optimize business operations around one or more business metrics.

Similarly, according to an aspect, a restaurant may access restaurant computer 140 to enter or update a variety of inventory information that may include current inventory on hand, re-order levels, expected usage and so on along with other information that may be stored in a database 150, and used by real-time inventory management system 300 that may offer or execute inventory related actions to optimize inventory operations around one or more business metrics. According to one aspect, point-of-sale devices may automatically update inventory information in real-time after the completion of a transaction.

Similarly, according to another aspect, a restaurant manager may access restaurant computer 140 to enter or update a variety of operational information that may include staffing needs, training needs, hours of operations, upcoming market events and so on along with other information that may be stored in a database 150, and used by real-time staffing management system 400 that may offer or execute staffing actions to optimize business operations around one or more staffing metrics. Other such real-time information and factors may also be determined by system through access to one or more external resources 180 such as a utility provider that may include current usage, current rates, balance due and so forth. Other exemplary external resources may comprise public data services or sources such as weather service, social media platforms, news outlets and rating services.

Likewise, vendors may access vendor computer 160 to enter information about service or product provided, invoice information, credit terms and any current or upcoming promotions along with other information. Examples of the types of information that a vendor may enter include, but are not limited to: restaurant name, location, types of food item provided (e.g. rice, beans, wagyu beef, scallions, grass fed young chickens, chicken liver pate, cod liver oil), type of non-food item provided (e.g. 12 oz paper cups, 9 inch paper dinner plate, bleach, lemon wax, rubbing alcohol) service offered (e.g. uniform service, landscaping maintenance), item pricing, credit terms, special pricing options like volume discounting daily specials or seasonal offerings. In some aspects, the system may be able to determine certain information by accessing external resources 180 such as mapping websites and applications. For example, system may access a publicly-available mapping website such as Google maps, which may contain information about the restaurant's name, location, types of food offered, hours of operation, phone number, etc. Thus, in some aspects, it is not necessary for the restaurant to enter certain information through portal, as the information may be automatically obtained from external resources 180.

In an aspect, when a staff mobile device 120 connects to real-time finance, inventory and staffing management system 110 and requests a microloan, real-time financial system 200 queries database 150 for the risk profile of staff, current cash profile of the restaurant and compares with loan request and offers a loan and associated terms. The staff may decide to accept or decline loan term offers through the staff mobile device 120. Similarly, staff may access staff mobile device 120 and request scheduling information or updates from the real-time staffing management system 400.

In some aspects, real-time staffing management system 400, through staff mobile device 120, may also provide information to the staff of schedule modifications or upcoming staffing needs which the staff may accept or decline. If the restaurant has entered information such as incentive pay, real-time staffing management system, 400 may use that information to offer the restaurant staff additional monetary or other incentives (e.g. future vacation day with pay) to accept a shift schedule that is sorely needed to be filled. Such incentives may be adjusted for busy periods at the restaurant (typically around lunch and dinner) either automatically based on the restaurant's history as stored in a database 150, or by retrieving information stored in a database 150 that has been manually entered by the restaurant through restaurant computer 140 or restaurant mobile device 130.

Figure 2:
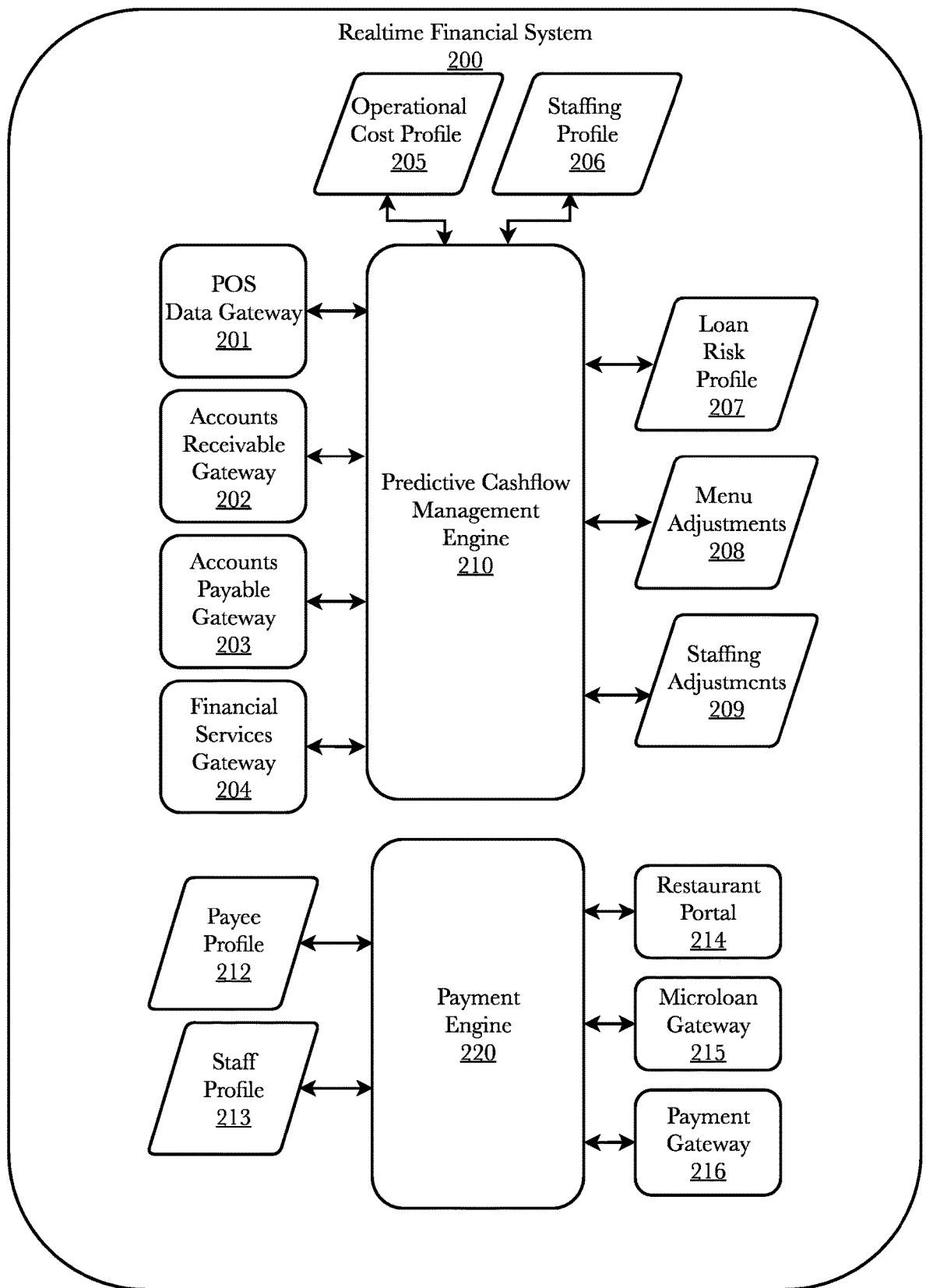
FIG. 2 is a block diagram illustrating an exemplary architecture for an aspect of a real-time financial system.

FIG. 2 is a block diagram illustrating an exemplary architecture for an aspect of a real-time financial system 200. According to an aspect, a real-time financial system 200 comprises several subsystems including a predictive cash flow management engine 210 and a payment engine 220. A predictive cashflow management engine 210 may connect, for a bi-lateral data exchange, between POS data gateway 201, accounts receivable gateway 202, account payable gateway 203, financial services gateway 204; may receive operational cost profile 205 and staffing profile 206; and may provide as outputs loan risk profile 207, menu adjustment 208, and staffing adjustment 209. A payment engine 220 may receive payee profile 212, staff profile 213; establish a bi-lateral data exchange with restaurant gateway 214, microloan gateway 215, and payment gateway 216.

According to an aspect, when a restaurant desires to optimize their operations around a given parameter, for example to maximize profitability, predictive cashflow management engine 210 receives current menu offering from POS data gateway 201, current outstanding invoices from account receivable gateway 202, current outstanding accounts payable from accounts payable gateway 203, current banking balances from financial services gateway 204, operational cost profile 205, staffing profile 206. Input data set is cleansed and formatted using machine learning or other techniques to those skilled in the art. A predictive cashflow engine then uses dimension gradient optimization technique to maximize a profitability function. The predictive cashflow management engine will provide a corresponding set of instructions for menu adjustments 208, staffing adjustments 209, and makes updated proposals to suppliers through accounts payable gateway 203 to maximize profitability around a given set of parameters.

In some aspects, real-time financial system 200 engine may have a payment subsystem in which a payment engine 220 makes a loan to a restaurant staff or other restaurant partner through a microloan gateway 215 based upon information received from the loan risk profile 207 via the predictive cashflow management engine 210. Loan risk profile 207 may be determined by deep learning algorithms such as elastic net, random forest, or gradient boosting models or other approaches known to those skilled in the art.

Note that this example is simplified for clarity, and that real-time financial system 200 will address a much broader set of factors and variables, as described elsewhere herein. The predictive cashflow management engine 210 may use any number of optimization algorithms, including machine learning algorithms or others known in the art, to find optimal solutions to the large number of variables presented.

Figure 3:
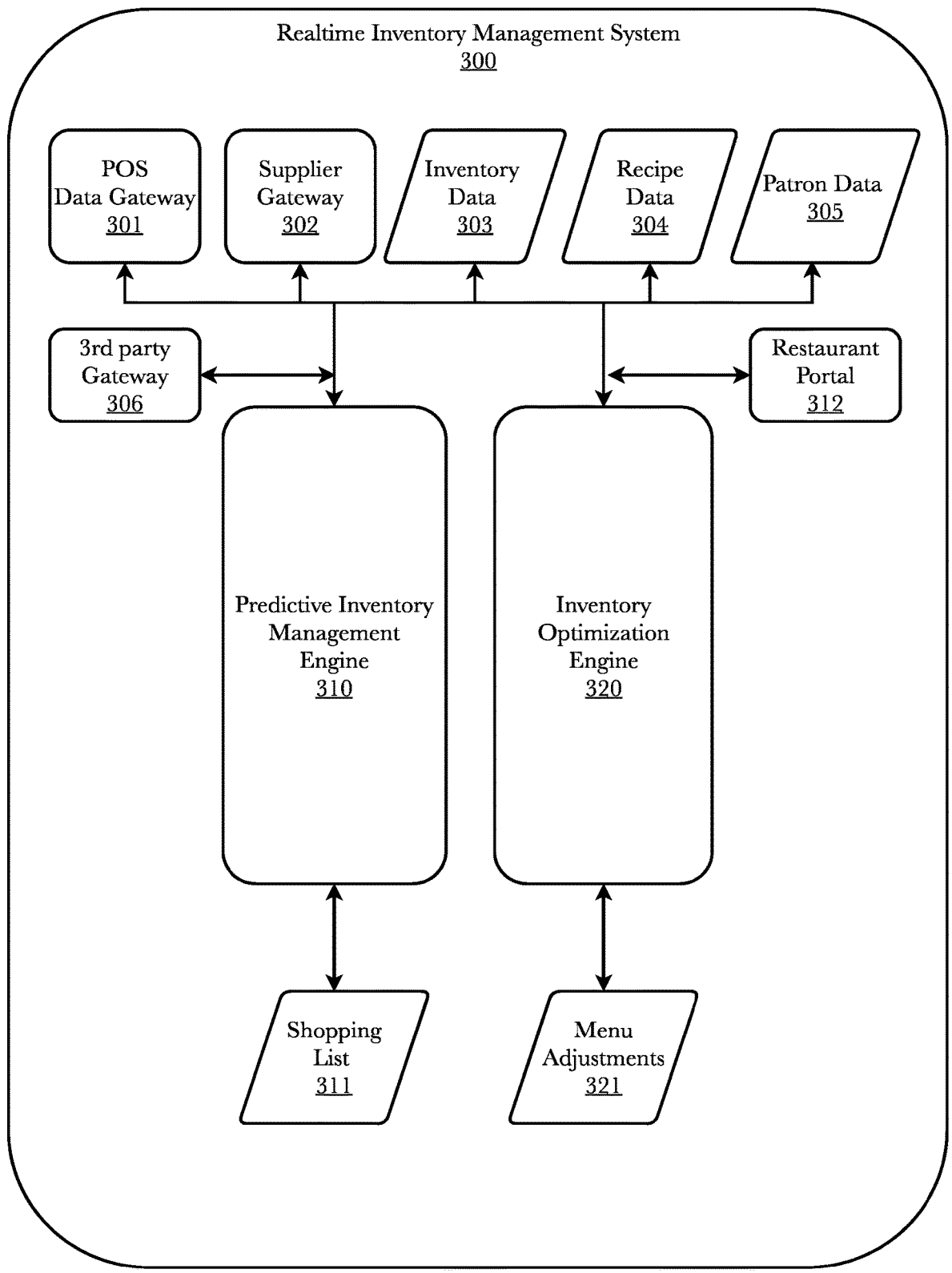
FIG. 3 is a block diagram illustrating an exemplary architecture for an aspect of a real-time inventory management system.

FIG. 3 is a block diagram illustrating an exemplary architecture for an aspect of a real-time inventory management system 300. According to an aspect, real-time inventory management system 300 comprises, a predictive inventory management engine 310, inventory optimization engine 320 that may connect to POS data gateway 301, supplier gateway 302, inventory data 303, recipe data 304, patron data 305, $3^{rd}$ party gateway 306 and restaurant portal 312; may provide as outputs shopping list 311, menu adjustment 321.

Figure 4:
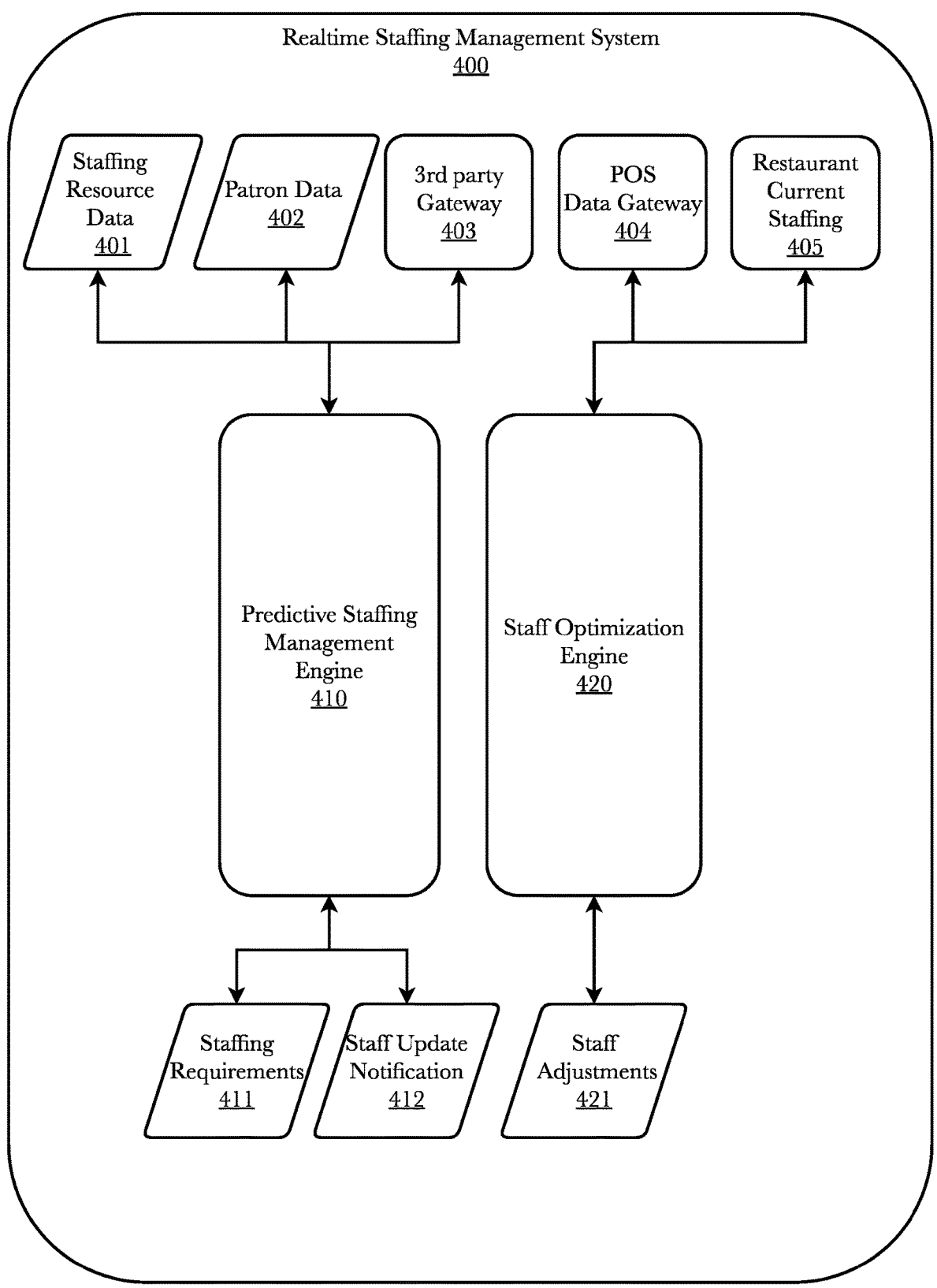
FIG. 4 is a block diagram illustrating an exemplary architecture for an aspect of a real-time staffing management system.

FIG. 4 is a block diagram illustrating an exemplary architecture for an aspect of a real-time staffing management system 400. According to an aspect, real-time staffing management system 400 comprises, a predictive staffing management engine 410 and staffing optimization engine 420. A predictive staffing management engine 410 may connect to staffing resource data 401, patron data 402, and $3^{rd}$ party gateway 403, provide as output staffing requirements 411 and staff update notification 412; a staff optimization engine 420 may connect to POS data gateway 404 and current staffing data 405, may provide as output staff adjustments 421.

DETAILED DESCRIPTION OF EXEMPLARY ASPECTS

Figure 5:
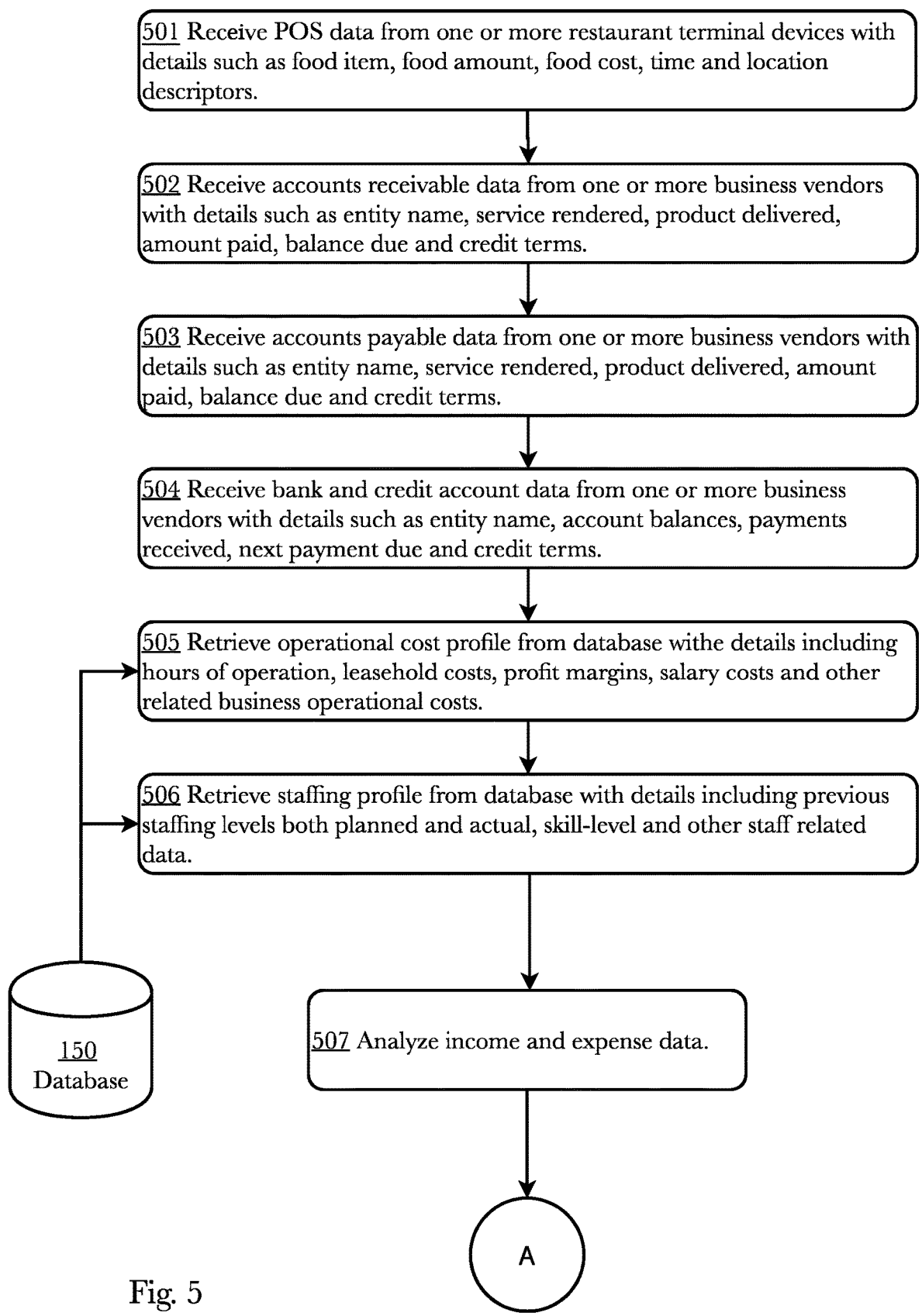
FIG. 5 is a flow diagram showing the steps of an exemplary method for real-time predictive cash flow for a restaurant business from initial receipt of income and expense data through analysis of income and expense data.

FIG. 5 is a flow diagram showing the steps of an exemplary method for predictive cashflow. In a first step, 501 receive point-of-sales ("POS") data from a plurality of business computing devices for one or more sales transactions, POS data for each sales transaction comprising food item, food amount, food cost, time and location descriptors; In a next step, 502 receive accounts receivable data from a plurality of business computing devices for one or more business vendors, accounts receivable data comprising account receivable entity name, service rendered, product delivered, amount paid, balance due and credit terms. In a next step, 503 receive accounts payable data from a plurality of business computing devices for one or more business vendors, accounts payable data comprising account payable entity name, service rendered, product delivered, amount paid, balance due and credit terms. In a next step, 504 receive bank and credit card account data from a plurality of business computing devices for one or more banking entities, bank and credit card account data comprising account balances, payments received and balance. In a next step, 505 retrieve operational cost profile from an operational database 150, operational cost profile comprising hours of operation, leasehold costs, tax and insurance costs, cost of goods sold, profit margins, salary costs, hourly wage costs, professional services costs. In a next step, 506 retrieve staffing profile from a staffing management database 150, staffing profile comprising number of hourly staff previously scheduled, hourly staff previously worked, staff skill-level, planned hourly staff schedule. In a next step, 507 analyze income and expense data that may include deep learning techniques such as recurring neural networks or other techniques familiar to those skilled in the art.

Figure 6:
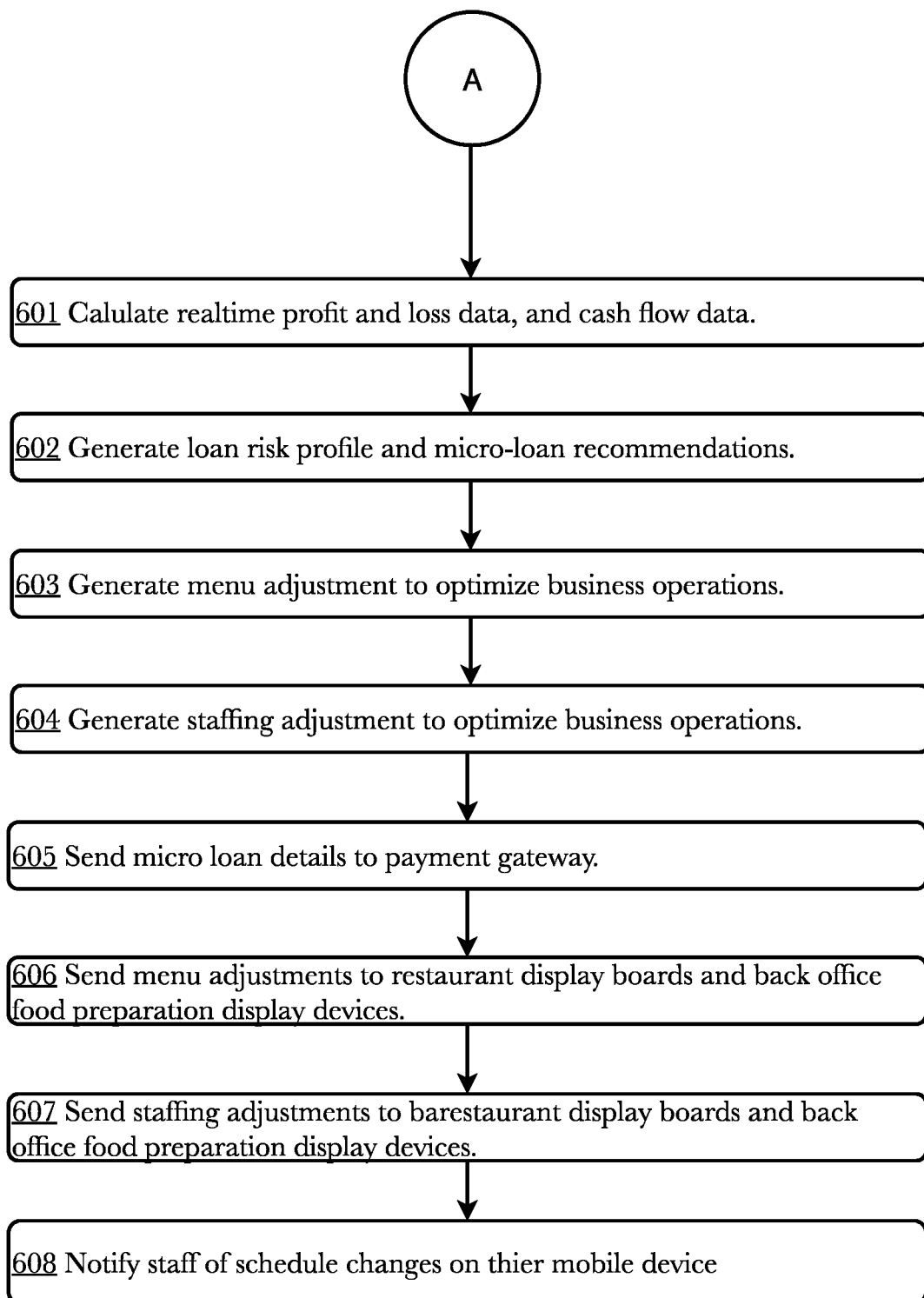
FIG. 6 is a flow diagram showing the steps of an exemplary method for real-time predictive cash flow for a restaurant business from calculation of real-time cash flow through notification of staffing changes to restaurant staff.

FIG. 6 is a flow diagram showing the steps of an exemplary method for predictive cashflow continuation of FIG. 5. In a first step, 601 calculate real-time profit and loss, cash flow data. In a next step, 602 generate loan risk profile using deep learning algorithms such as elastic net, random forest, or gradient boosting models or other approaches known to those skilled in the art, and provide recommendation for micro-loans based on cash flow to optimize business operations. In a next step, 603 generate menu adjustment to optimize business operations. In a next step, 604 generate staffing adjustment to optimize business operations. In a next step, 605 send microloan details to payment gateway. In a next step, 606 send menu adjustments to restaurant display boards and back office food preparation display devices. In a next step, 607 send staffing adjustments to business compute device, recommendation comprising staffing skill level, schedules, cost impact. In a next step, 608 notify staff of schedule changes via their mobile device.

Figure 7:
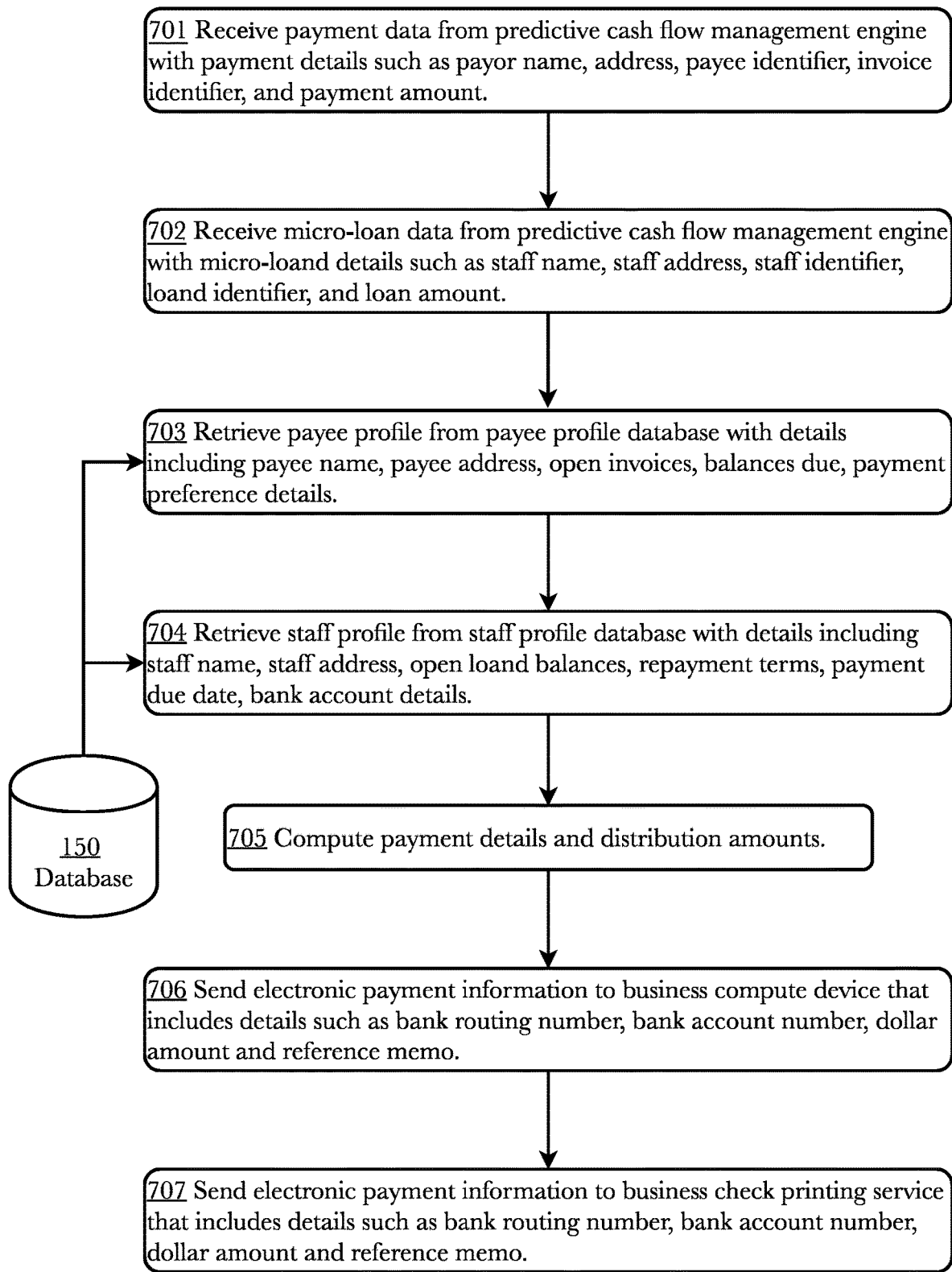
FIG. 7 is a flow diagram showing the steps of an exemplary method for real-time payment engine for a restaurant business from initial receipt of payment data through sending payments to vendors and restaurant staff.

FIG. 7 is a flow diagram showing the steps of an exemplary method for real-time payment processing. In a first step, 701 receive payment data from a predictive cash flow management engine, payment data comprising payor name and address, payee identifier, invoice identifier, and payment amount. In a next step, 702 receive micro-loan data from a predictive cash flow management engine, micro-loan data comprising employees name and address, employee identifier, loan identifier, and loan amount. In a next step, 703 retrieve payee profile data from payee profile database 150, payee profile data comprising payees name, payee address, open invoices, balances due, payment preference details. In a next step, 704 retrieve staff profile data from staff profile database, staff profile data comprising staff name, staff address, open loan balances, repayment terms, payment due date, bank account details. In a next step, 705 compute payment details and distribution amounts. In a next step, 706 send electronic payment information to business compute device, electronic payment comprising bank routing number, bank account number, dollar amount, reference memo. In a next step, 707 send electronic payment to business check printing, electronic payment comprising payee name, payee address, invoice number, payment amount.

Figure 8:
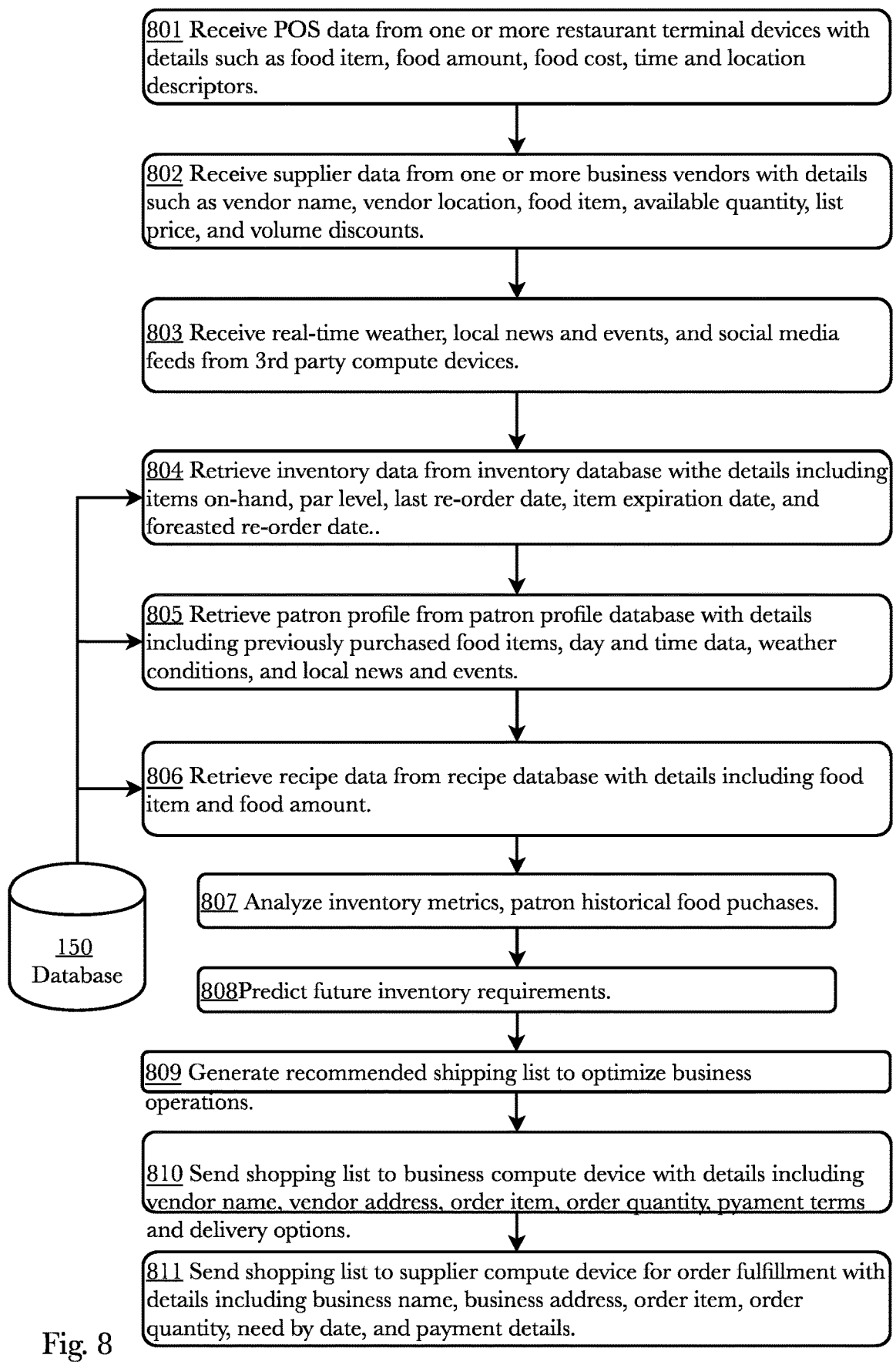
FIG. 8 is a flow diagram showing the steps of an exemplary method for predictive inventory management for a restaurant business from initial receipt of supplier data through sending shopping lists to vendors for order fulfillment.

FIG. 8 is a flow diagram showing the steps of an exemplary method for predictive inventory management process. In a first step, 801 receive point-of-sales ("POS") data from a plurality of business computing devices for one or more sales transactions, POS data for each sales transaction comprising food item, food amount, food cost, time and location descriptors. In a next step, 802 receive supplier data from a plurality of business computing devices for one or more supplier business entities, supplier data for each supplier business entity comprising vendor name, vendor location, food item, available quantity, list price, volume discounts. In a next step, 803 receive real-time $3^{rd}$ party data from a plurality of business computing devices for one or more data sources, the $3^{rd}$ party data comprising local news and events, current and forecasted weather, social media feeds, rating and review sites. In a next step, 804 retrieve inventory data from inventory database, inventory data comprising items on-hand, par level, last re-order date, expiration date, forecasted re-order date. In a next step, 805 retrieve patron data from patron profile database, patron data comprising food items previously purchased, day and time data, weather conditions, local news and events. In a next step, 806 retrieve recipe data from recipe database, recipe data comprising food type, food amount. In a next step, 807 analyze inventory metrics, patron historical food purchase history. In a next step, 808 predict future inventory requirements. In a next step, 809 generate recommended shopping list to optimize business operations. In a next step, 810 send recommended shopping list to business compute device, recommended shopping list comprising vendor name, vendor address, order item, order quantity, payment terms delivery options available. In a next step, 811 send recommended shopping list to supplier business compute device for order fulfillment, recommended shopping list comprising vendor name, vendor address, order item, order quantity, payment terms delivery options available.

Figure 9:
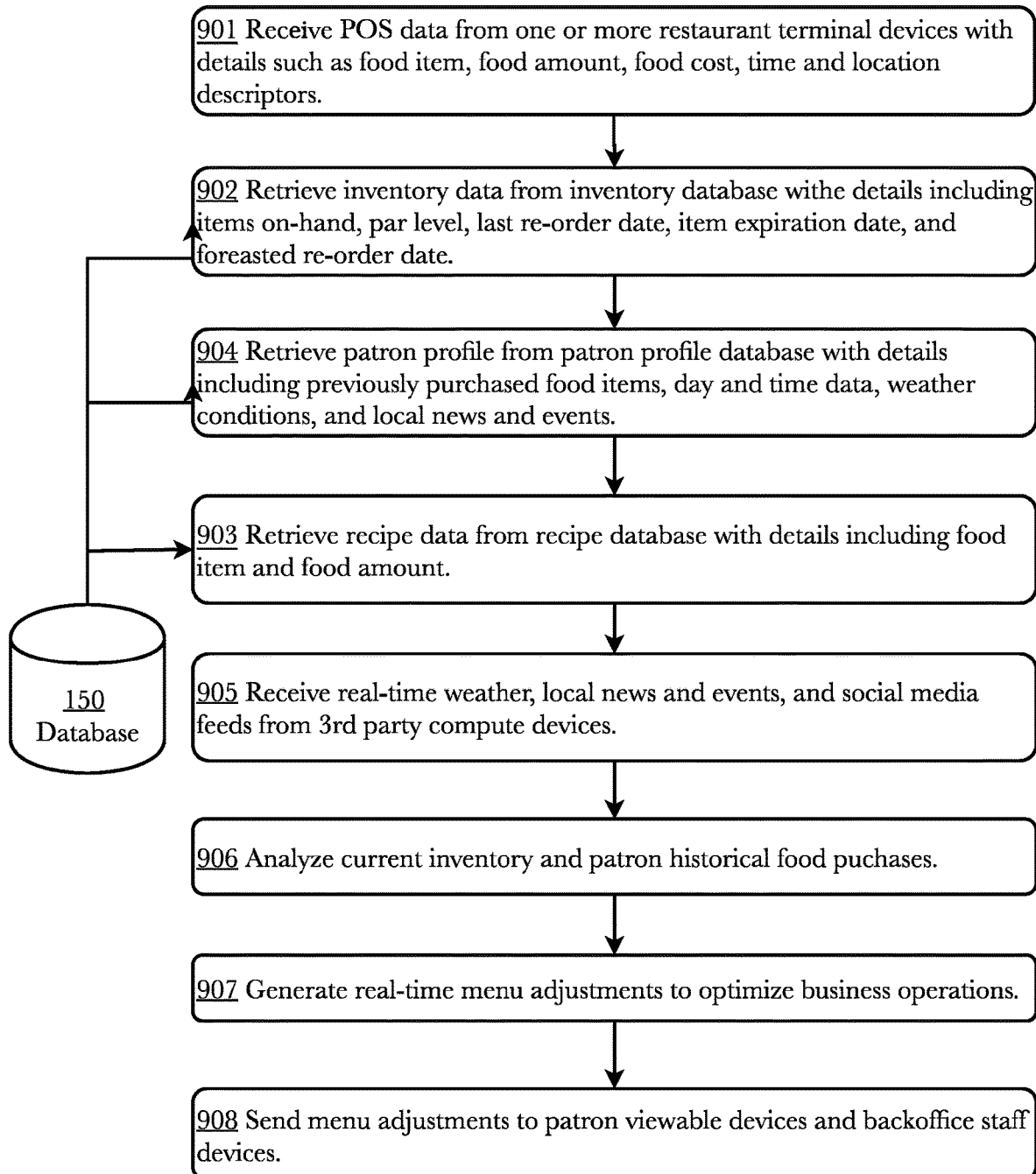
FIG. 9 is a flow diagram showing the steps of an exemplary method for real-time inventory optimization for a restaurant business from initial receipt of supplier data through sending shopping lists to vendors for order fulfillment.

FIG. 9 is a flow diagram showing the steps of an exemplary method for inventory optimization process. In a first step, 901 receive point-of-sales ("POS") data from a plurality of business computing devices for one or more sales transactions, POS data for each sales transaction comprising food item, food amount, food cost, time and location descriptors. In a next step, 902 retrieve inventory data from inventory database, inventory data comprising items on-hand, par level, last re-order date, expiration date, forecasted re-order date. In a next step, 903 retrieve recipe data from recipe database, recipe data comprising food type, food amount. In a next step, 904 retrieve patron data from patron profile database, the patron data comprising food items previously purchased, day and time data, weather conditions, surrounding circumstances including local news and events. In a next step, 905 receive real-time $3^{rd}$ party data from a plurality of business computing devices for one or more data sources, the $3^{rd}$ party data comprising local news and events, current and forecasted weather, social media feeds, rating and review sites. In a next step, 906 analyze inventory metrics, patron food purchase history and predict inventory requirements using Deep Learning algorithms such as elastic net, random forest, or gradient boosting models or other Artificial Intelligent techniques known to those skilled in the art. In a next step, 907 generate recommended menu adjustments to optimize business operations. In a next step, 908 send recommended menu adjustments to business compute device, the recommended menu adjustments comprising food item name, price, promotion information.

Figure 10:
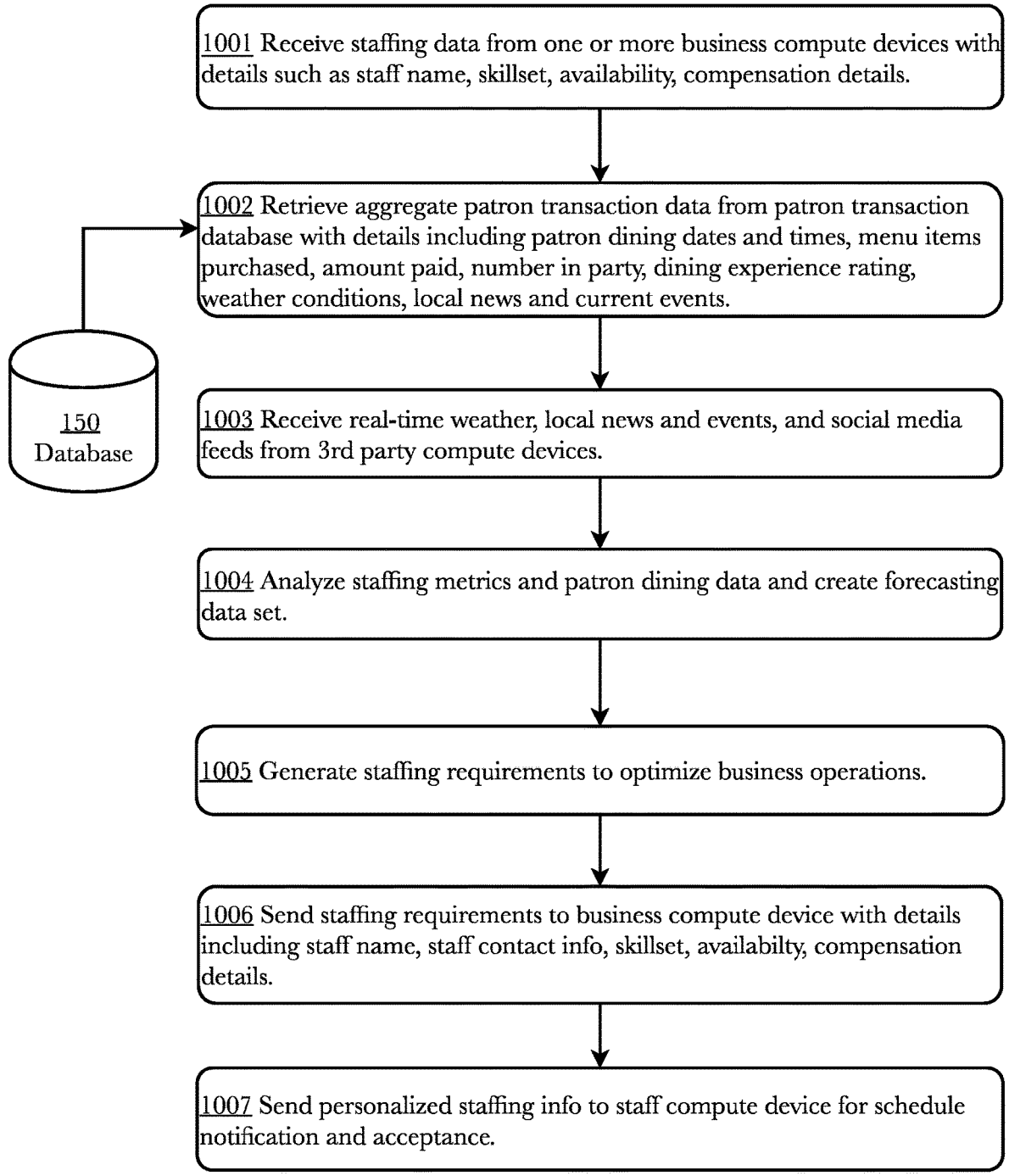
FIG. 10 is a flow diagram showing the steps of an exemplary method for predictive staffing management for a restaurant business from initial receipt of supplier data through sending shopping lists to vendors for order fulfillment.

FIG. 10 is a flow diagram showing the steps of an exemplary method for predictive staff management process. In a first step, 1001 receive staffing data from a plurality of business computing devices for one or more staffing business entities, staffing data for each staffing business entity comprising staff name, skillset, availability, compensation details. In a next step, 1002 retrieve aggregate patron transaction data from patron transaction database, patron transaction data comprising patron dining dates and times, menu items purchased, amount paid, number in party, dining experience rating, weather conditions, local news and events. In a next step, 1003 receive real-time $3^{rd}$ party data from a plurality of business computing devices for one or more data sources, $3^{rd}$ party data comprising local news and events, current and forecasted weather, social media feeds, rating and review sites. In a next step, 1004 analyze staffing metrics, patron dining data and create predicted data set using Deep Learning algorithms such as elastic net, random forest, or gradient boosting models or other Artificial Intelligent techniques known to those skilled in the art. In a next step, 1005 generate recommended staffing requirements to optimize business operations. In a next step, 1006 send staffing requirements to business compute device, staffing requirements list comprising staff name, staff contact info, skillset, availability, and compensation details. In a next step, 1007 send personalized staffing info to staff compute device for schedule notification and acceptance to staff member.

Figure 11:
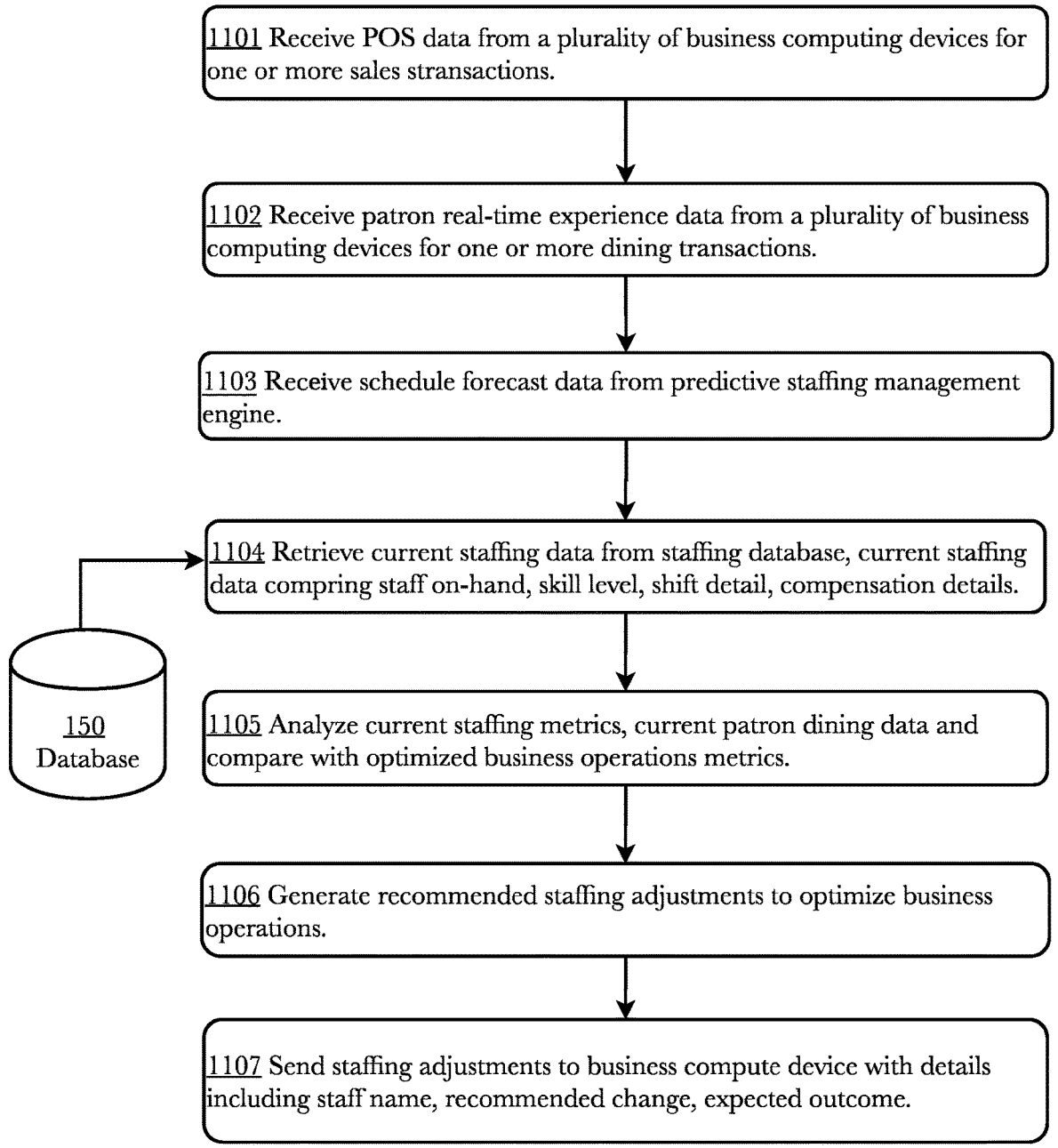
FIG. 11 is a flow diagram showing the steps of an exemplary method for real-time staffing optimization for a restaurant business from initial receipt of supplier data through sending shopping lists to vendors for order fulfillment.

FIG. 11 is a flow diagram showing the steps of an exemplary method for staff optimization process. In a first step, 1101 receive point-of-sales ("POS") data from a plurality of business computing devices for one or more sales transactions, POS data for each sales transaction comprising food item, food amount, food cost, time and location descriptors. In a next step, 1102 receive patron real-time experience data from a plurality of business computing devices for one or more dining transactions, patron real-time experience data for each transaction comprising rating data, food items ordered, food cost, time and location descriptors. In a next step, 1103 receive schedule forecast data from predictive staffing management engine. In a next step, 1104 retrieve real-time staffing data from staffing database, real-time staffing data comprising staff on-hand, skill level, shift detail, compensation details. In a next step, 1105 analyze current staffing metrics, current patron dining experience and compare with optimized business operation metrics. In a next step, 1106 generate recommended staffing adjustments to optimize business operations. In a next step, 1107 send staffing adjustments to business compute device, staffing adjustments comprising staff name, recommended change, expected outcome.

An exemplary financial forecasting technique may include applying Bayes' Theorem or similar financial forecasting technique familiar to those skilled in the art. In making a particular business decision (e.g. extending a microloan to a staff member, paying a vendor bill, making a food item purchase, etc.), one can forecast the resulting financial outcome (e.g. changes to restaurants' net income stream, balance sheets, bond credit rating, changing value of assets and other related financial data) with a high probability of occurring.

An exemplary semantic comparison method may include term vector space analysis technique to those familiar in the art. Term vector modeling is an algebraic model for representing text and text documents as vectors. Each term or word in a text document typically corresponds to a dimension in that vector. Once a text document is described as a word vector, comparisons between two vectors may be made using vector calculus. One useful technique to determine similarities between documents is by comparing the deviation of angles between each document vector and the original query vector where the query is represented as a vector with same dimension as the vectors that represent the other documents.

An exemplary dimensional reduction technique familiar to those skilled in the art is Principal Component Analysis ("PCA"), which may be used to optimize the variables prior to vectorization to reduce dimensionality of resulting vectors prior to feeding into a machine learning algorithm.

An exemplary optimization method may include deep learning techniques familiar to those skilled in the art. One such form of deep learning that is particularly useful when generating text is Recurrent Neural Networks ("RNN") using long short-term memory ("LSTMs") units or cells. A single LS™ is comprised of a memory-containing cell, an input gate, an output gate and a forget gate. The input and forget gate determine how much of incoming values transit to the output gate and the activation function of the gates is usually a logistic function. The initial input data will cause the model to learn the weights of connections that influence the activity of these gates which will impact the resultant output. To generate optimized staffing for a given restaurant, historic staffing for a given restaurant, patron loading, patron rating review along with other data are fed into the input gate of the RNN, in turn the RNN will learn how best to staff for given restaurant situation and create an optimized staffing output.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 12:
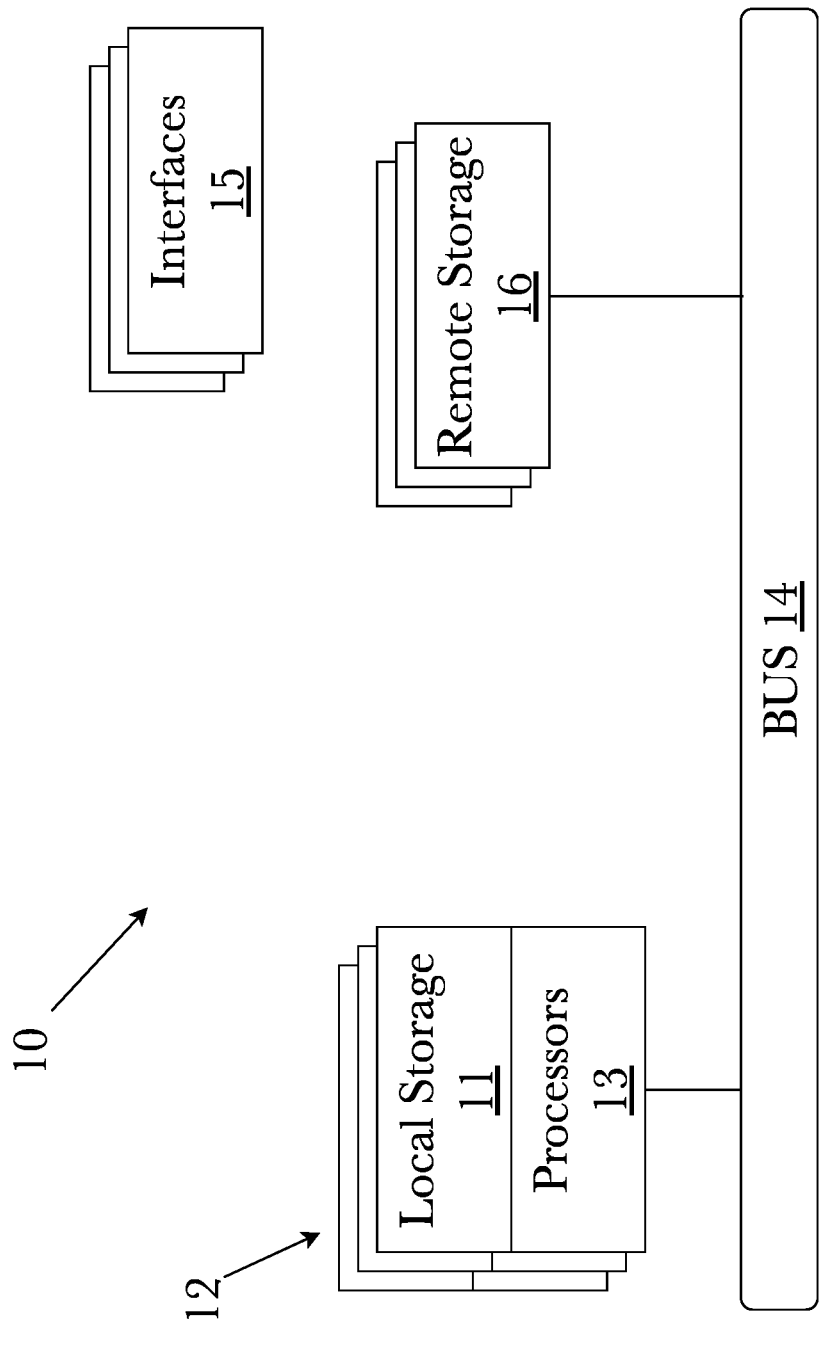
FIG. 12 is a block diagram illustrating an exemplary hardware architecture of a computing device.

Referring now to FIG. 12, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 12 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 13:
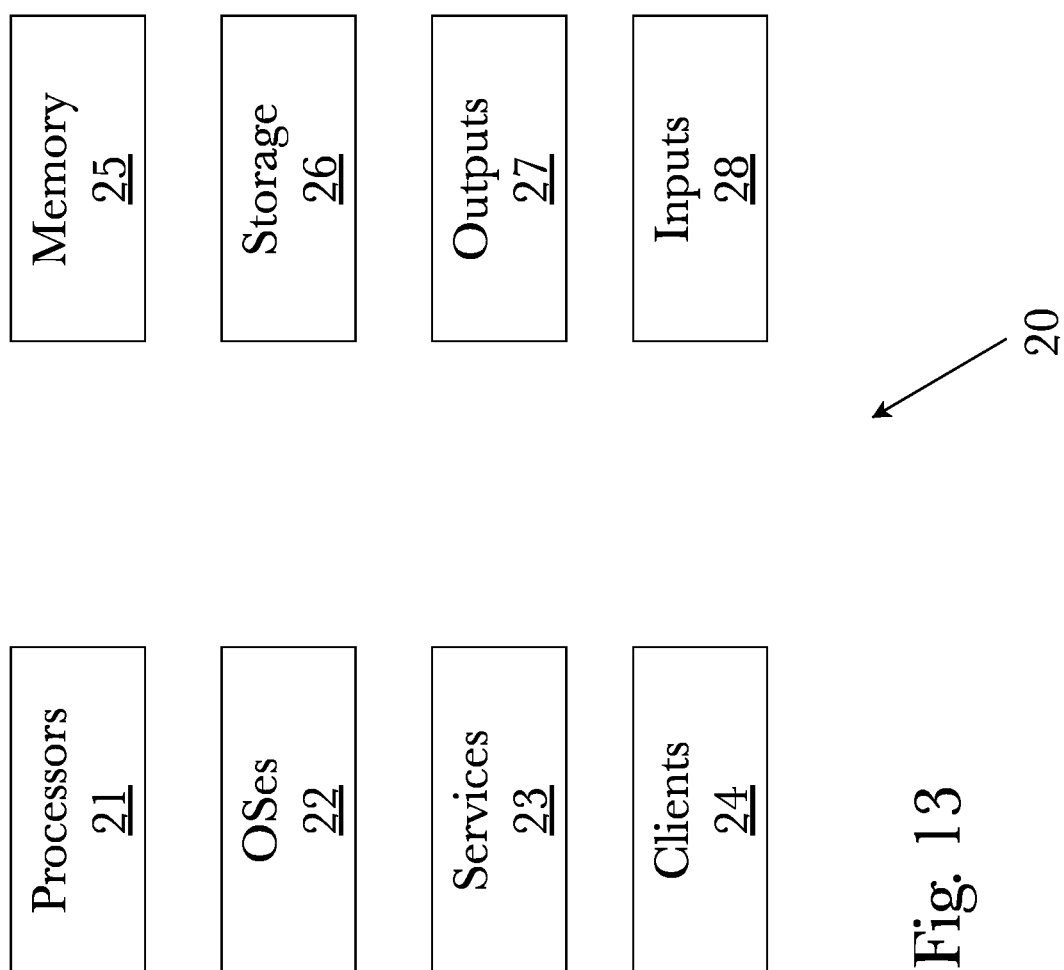
FIG. 13 is a block diagram illustrating an exemplary logical architecture for a client device.

In some aspects, systems may be implemented on a standalone computing system. Referring now to FIG. 13, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20 and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 13). Examples of storage devices 26 include flash memory, magnetic hard drive, CD-ROM, and/or the like.

Figure 14:
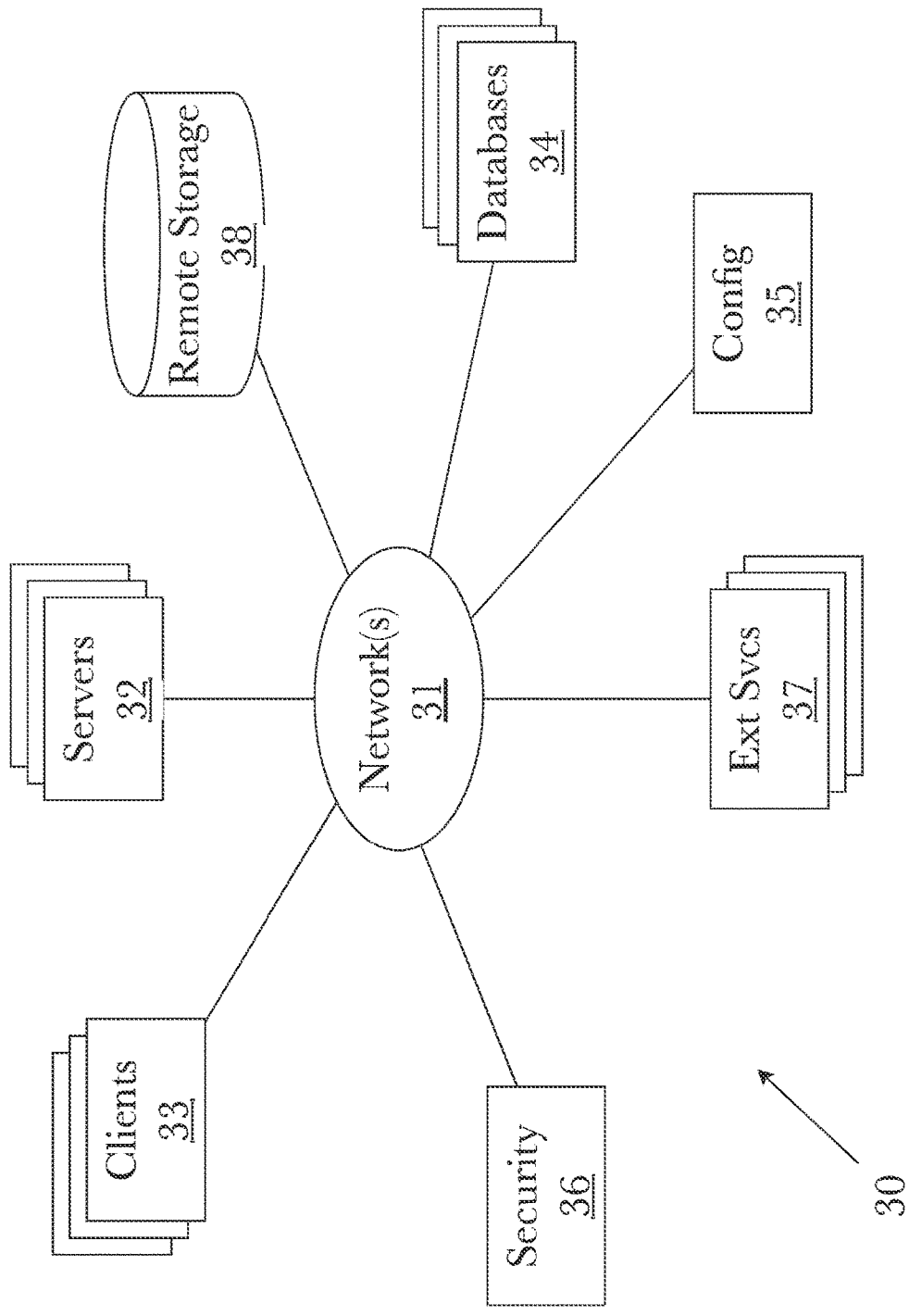
FIG. 14 is a block diagram showing an exemplary architectural arrangement of clients, servers, and external services.

In some aspects, systems may be implemented on a distributed computing network, such as one having any number of clients and/or servers. Referring now to FIG. 14, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 13. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as Wi-Fi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 15:
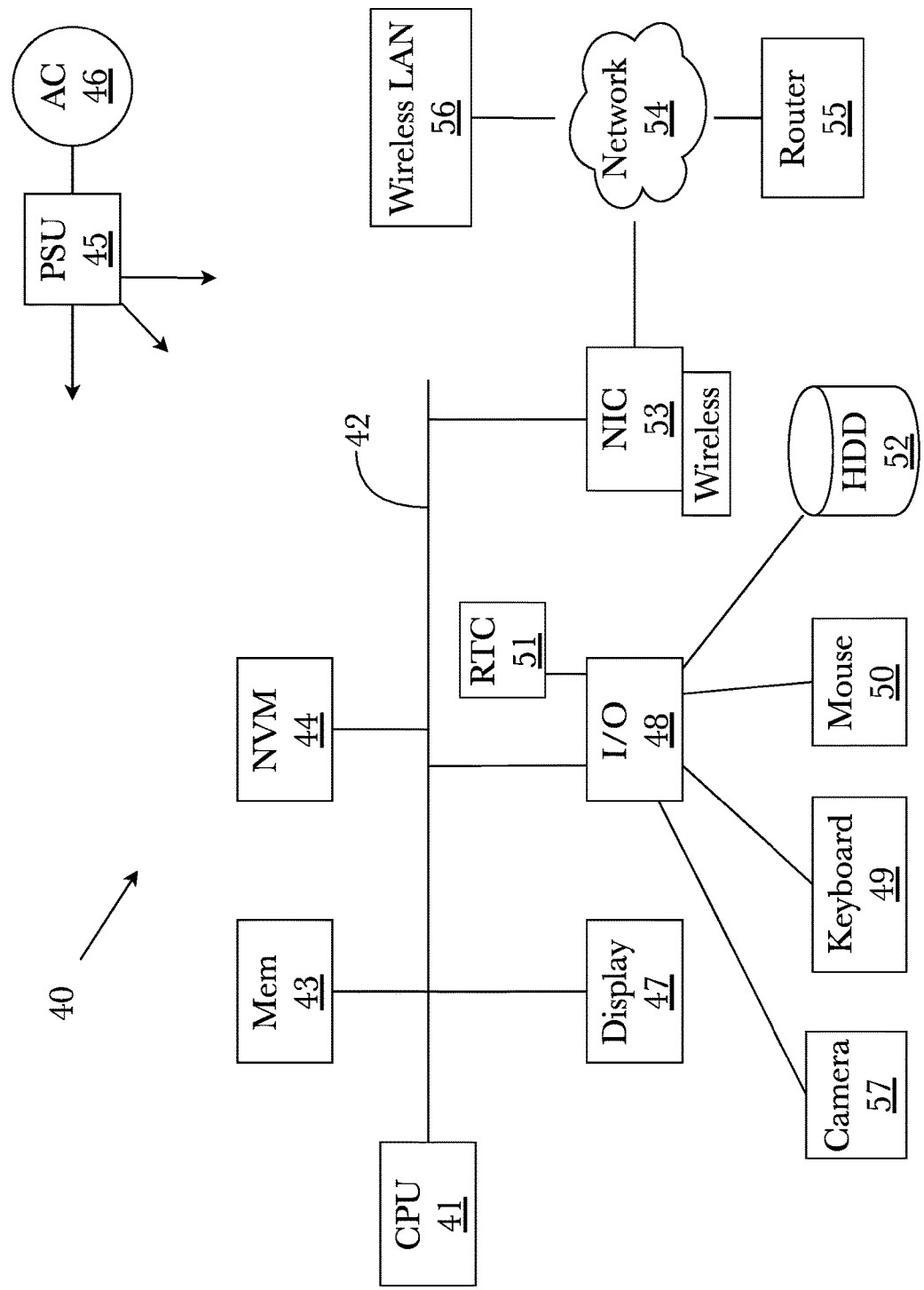
FIG. 15 is block diagram illustrating another aspect of an exemplary hardware architecture of a computing device.

FIG. 15 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with a system of any particular aspect, and such modules may be variously implemented to run on server and/or client components.

What is claimed is:

1. A system using machine learning for integrated restaurant real-time financial, inventory, and staffing management comprising:
    a computing device comprising a memory, a processor, and a non-volatile data storage device;
    a real-time finance, inventory and staffing management server comprising a first plurality of programming instructions stored in the memory which, when operating on the processor, causes the computing device to:
        receive real-time user information from a user device via a wireless network, the real-time user information comprising device location, time, and user financial information;
        receive a plurality of stored and third-party data comprising financial, inventory, staff, and patron related information via the wireless network, vectorize the received plurality of stored and third party data using principal component analysis to reduce the dimensionality of the vectors, use the vectors as input into a machine learning algorithm to create a plurality of neural networks, and use the plurality of neural networks to:
            analyze the received data using vector space analysis to predict future patron attendance based at least in part on received location information;
            analyze the received data using vector space analysis to predict future staffing requirements based on the received location information;
            analyze the received data using vector space analysis to determine real-time inventory usage;
            automatically generate a plurality of inventory adjustment recommendations based on the determined real-time inventory usage, patron data, and third-party data comprising at least one of: local news and events, current and forecasted weather, a social media posting, or a rating or review;
            automatically place an order for goods based on the determined real-time inventory usage and the plurality of inventory adjustment recommendations; and
            analyze the received data to determine real-time cash flow and to predict future cash flow.

2. The system of claim 1, further comprising a financial database stored on the non-volatile data storage device, the financial database comprising at least one of: point-of-sale data for a plurality of sales transactions, accounts receivable information for a plurality of vendors, accounts payable information for a plurality of vendors, financial account information for a plurality of banking institutions, a food item, a food amount, a food cost, or time and location descriptors.

3. The system of claim 1, wherein the real-time finance, inventory and staffing management server receives financial data; and
    wherein the received financial data comprises accounts receivable and accounts payable data, and the accounts receivable and accounts payable data comprises at least one of: an account receivable entity name, a service rendered, a product delivered, an amount paid, balance due and credit terms, an account payable entity name, a service rendered, a product delivered, an amount paid, or balance due and credit terms.

4. The system of claim 2, further comprising a stored operational cost profile, the operational cost profile comprising at least one of: hours of operation, leasehold costs, tax and insurance costs, cost of goods sold, profit margins, salary costs, hourly wage costs, or professional services costs.

5. The system of claim 1, wherein the retrieved staff data comprises a staffing profile, the staffing profile comprising at least one of: number of hourly staff previously scheduled, hourly staff previously worked, staff skill-level, planned hourly staff schedule, a staff member name, a staff member skillset, a staff member availability, or compensation details for a staff member.

6. The system of claim 5, wherein the staffing profile is updated with real-time third-party data, the real-time third-party data comprising at least one of: local news and events, current and forecasted weather, a social media posting, or a rating or review relevant to each staff profile.

7. The system of claim 6, wherein the staffing profile is used to generate a loan risk profile and a plurality of loan recommendations based on the loan risk profile.

8. The system of claim 2, further comprising an inventory database stored on the non-volatile data storage device, the inventory database comprising at least one of: a quantity of an item on-hand, a par level, a last re-order date, an expiration date, or a forecasted re-order date; real-time third-party data, the real-time third-party data comprising at least one of: local news and events, current and forecasted weather, a social media posting, or a rating or review; and stored patron data comprising at least one of: a food item previously purchased, day and time data, weather conditions, or local news and events.

9. The system of claim 1, wherein the inventory adjustment recommendations generate menu changes for a restaurant based on patron trends or inventory availability.

10. The system of claim 1, further comprising a payment engine used to:

receive payment data, the payment data comprising at least one of: a payor name, a payor address, a payee identifier, an invoice identifier, or a payment amount;

retrieve a stored payee profile, the stored payee profile comprising at least one of: a payee name, a payee address, an open invoice, a balance due, or payment preference information;

transmit payment information to a payment processing system, the payment information being based on the payment data and the payment transaction.

11. A method using machine learning for integrated restaurant real-time financial, inventory, and staffing management comprising the steps of:

connecting a real-time finance, inventory and staffing management server comprising a first plurality of programming instructions stored in a memory of a computing device comprising the memory, a processor, and a non-volatile data storage device, to a user device via a wireless network;

wirelessly receiving, at the real-time finance, inventory and staffing management server, real-time user information from the user device, the real-time user information comprising device location, time, and user financial information;

wirelessly receiving, at the real-time finance, inventory and staffing management server, a plurality of stored and third-party data comprising financial, inventory, staff, and patron related information, vectorizing the received plurality of stored and third-party data using principal component analysis to reduce the dimensionality of the vectors, using the vectors as input into a machine learning algorithm to create a plurality of neural networks;

using the plurality of neural networks to:
analyze the received data using vector space analysis to predict future patron attendance based at least in part on the received location information;
analyze the received data using vector space analysis to predict future staffing requirements based on the received location information;
analyze the received data using vector space analysis to determine real-time inventory usage;
automatically generate a plurality of inventory adjustment recommendations based on the determined real-time inventory usage, patron data, and third-party data comprising at least one of: local news and events, current and forecasted weather, a social media posting, or a rating or review;
automatically place an order for goods based on the determined real-time inventory usage and the plurality of inventory adjustment recommendations; and
analyze the received data to determine real-time cash flow and to predict future cash flow.

12. The method of claim 11, further comprising a financial database stored on the non-volatile data storage device, the financial database comprising at least one of: point-of-sale data for a plurality of sales transactions, accounts receivable information for a plurality of vendors, accounts payable information for a plurality of vendors, financial account information for a plurality of banking institutions, a food item, a food amount, a food cost, or time and location descriptors.

13. The method of claim 11, further comprising the steps of receiving financial data, wherein the received financial data comprises accounts receivable and accounts payable data, and the accounts receivable and accounts payable data comprises at least one of: an account receivable entity name, a service rendered, a product delivered, an amount paid, balance due and credit terms, an account payable entity name, a service rendered, a product delivered, an amount paid, or balance due and credit terms.

14. The method of claim 12, further comprising a stored operational cost profile, the operational cost profile comprising at least one of: hours of operation, leasehold costs, tax and insurance costs, cost of goods sold, profit margins, salary costs, hourly wage costs, or professional services costs.

15. The method of claim 11, wherein the retrieved staff data comprises a staffing profile, the staffing profile comprising at least one of: number of hourly staff previously scheduled, hourly staff previously worked, staff skill-level, planned hourly staff schedule, a staff member name, a staff member skillset, a staff member availability, or compensation details for a staff member.

16. The method of claim 15, wherein the staffing profile is updated with real-time third-party data, the real-time third-party data comprising at least one of: local news and events, current and forecasted weather, a social media posting, or a rating or review relevant to each staff profile.

17. The method of claim 16, wherein the staffing profile is used in generating a loan risk profile and a plurality of loan recommendations based on the loan risk profile.

18. The method of claim 12, further comprising an inventory database stored on the non-volatile data storage device, the inventory database comprising at least one of: a quantity of an item on-hand, a par level, a last re-order date, an expiration date, or a forecasted re-order date; real-time third-party data, the real-time third-party data comprising at least one of: local news and events, current and forecasted weather, a social media posting, or a rating or review; and stored patron data comprising at least one of: a food item previously purchased, day and time data, weather conditions, or local news and events.

19. The method of claim 11, further comprising the step of generating menu changes for a restaurant based on patron trends or inventory availability.

20. The method of claim 11, further comprising the steps of:

receiving payment data, the payment data comprising at least one of: a payor name, a payor address, a payee identifier, an invoice identifier, or a payment amount;

retrieving a stored payee profile, the stored payee profile comprising at least one of: a payee name, a payee address, an open invoice, a balance due, or payment preference information;

generating a payment transaction based on the payee profile and the loan recommendation; and transmitting payment information to a payment processing system, the payment information being based on the payment data and the payment transaction.

* * * * *